United States Patent
Obayashi et al.

(10) Patent No.: US 9,889,757 B2
(45) Date of Patent: Feb. 13, 2018

(54) MOBILE MACHINE, WIRELESS POWER TRANSMISSION SYSTEM, AND WIRELESS POWER TRANSMISSION METHOD

(71) Applicant: KABUSHIKI KAISHA TOSHIBA, Tokyo (JP)

(72) Inventors: Shuichi Obayashi, Kanagawa (JP); Noriaki Oodachi, Kanagawa (JP); Tetsu Shijo, Tokyo (JP); Kenichirou Ogawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/094,129

(22) Filed: Apr. 8, 2016

(65) Prior Publication Data

US 2016/0221461 A1     Aug. 4, 2016

Related U.S. Application Data

(63) Continuation of application No. PCT/JP2014/073816, filed on Sep. 9, 2014.

(30) Foreign Application Priority Data

Oct. 10, 2013  (JP) ................. 2013-213111

(51) Int. Cl.
*B60L 5/00*      (2006.01)
*B60L 11/18*     (2006.01)
(Continued)

(52) U.S. Cl.
CPC ............. *B60L 11/1829* (2013.01); *B60L 5/00* (2013.01); *B60L 11/18* (2013.01); *B60L 11/182* (2013.01);
(Continued)

(58) Field of Classification Search
CPC ............. B60L 11/1829; B60L 11/1833; B60L 11/182; B60L 5/00; B60L 11/18;
(Continued)

(56) References Cited

U.S. PATENT DOCUMENTS 4,800,328 A * 1/1989 Bolger .................... B60L 5/005
                                                      191/10
5,669,470 A * 9/1997 Ross ....................... B60L 5/005
                                                      191/10

(Continued)

FOREIGN PATENT DOCUMENTS

JP      2008-120357      5/2008
JP      2010-172084      8/2010
(Continued)

*Primary Examiner* — Drew J Brown
(74) *Attorney, Agent, or Firm* — Finnegan, Henderson, Farabow, Garrett & Dunner, L.L.P.

(57) ABSTRACT

According to one embodiment, a mobile machine includes a mobile body and a plurality of power transmission resonators. The mobile body is capable of being tilted in a particular direction such that a distance between a particular part opposed to a travel surface and the travel surface is reduced. The plurality of power transmission resonators are arranged at portions of the particular part of the mobile body, heights of the portions with reference to the travel surface being approximately identical with each other in a state of the mobile body being tilted.

15 Claims, 17 Drawing Sheets

(51) Int. Cl.
*H02J 7/00* (2006.01)
*H02J 17/00* (2006.01)
*H02J 5/00* (2016.01)
*H02J 50/12* (2016.01)
*H02J 7/02* (2016.01)

(52) U.S. Cl.
CPC ........... *B60L 11/1833* (2013.01); *H02J 5/005* (2013.01); *H02J 7/00* (2013.01); *H02J 7/025* (2013.01); *H02J 17/00* (2013.01); *H02J 50/12* (2016.02)

(58) Field of Classification Search
CPC .. H02J 7/025; H02J 5/005; H02J 50/12; H02J 7/00; H02J 17/00
See application file for complete search history.

(56) References Cited

U.S. PATENT DOCUMENTS

| | | | | |
|---|---|---|---|---|
| 7,880,337 | B2 * | 2/2011 | Farkas | B60L 11/005 307/104 |
| 8,292,052 | B2 * | 10/2012 | Bohori | B60L 5/005 191/10 |
| 8,508,184 | B2 | 8/2013 | Sakakibara et al. | |
| 8,946,938 | B2 * | 2/2015 | Kesler | B60L 11/182 307/10.1 |
| 9,073,442 | B2 * | 7/2015 | Ichikawa | B60L 11/123 |
| 9,327,608 | B2 * | 5/2016 | Gibbons, Jr. | B60L 11/1829 |
| 9,365,104 | B2 * | 6/2016 | Ichikawa | B60K 6/445 |
| 9,472,338 | B2 * | 10/2016 | Keeling | B60L 11/1833 |
| 9,586,491 | B2 * | 3/2017 | Konet | B60L 11/182 |
| 2008/0265684 | A1 | 10/2008 | Farkas | |
| 2011/0187317 | A1 | 8/2011 | Mitake et al. | |
| 2011/0256737 | A1 * | 10/2011 | Lacour | B60L 3/0069 439/34 |
| 2012/0025761 | A1 | 2/2012 | Takada et al. | |
| 2012/0187773 | A1 | 7/2012 | Wechlin et al. | |
| 2015/0239354 | A1 * | 8/2015 | Gorai | B60L 3/00 307/10.1 |
| 2015/0246620 | A1 * | 9/2015 | Fukushima | H02J 50/90 307/10.1 |
| 2015/0364924 | A1 * | 12/2015 | Yuasa | H01F 27/02 307/104 |

FOREIGN PATENT DOCUMENTS

| | | |
|---|---|---|
| JP | 2010-246348 | 10/2010 |
| JP | 2011-193617 | 9/2011 |
| JP | 2011-234496 | 11/2011 |
| JP | 2012-34468 | 2/2012 |
| JP | 2012-533280 | 12/2012 |
| WO | WO 2015/037690 A1 | 3/2015 |

\* cited by examiner

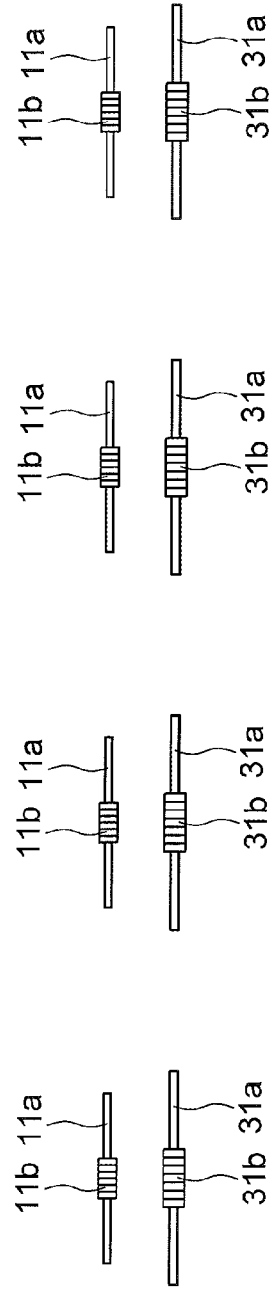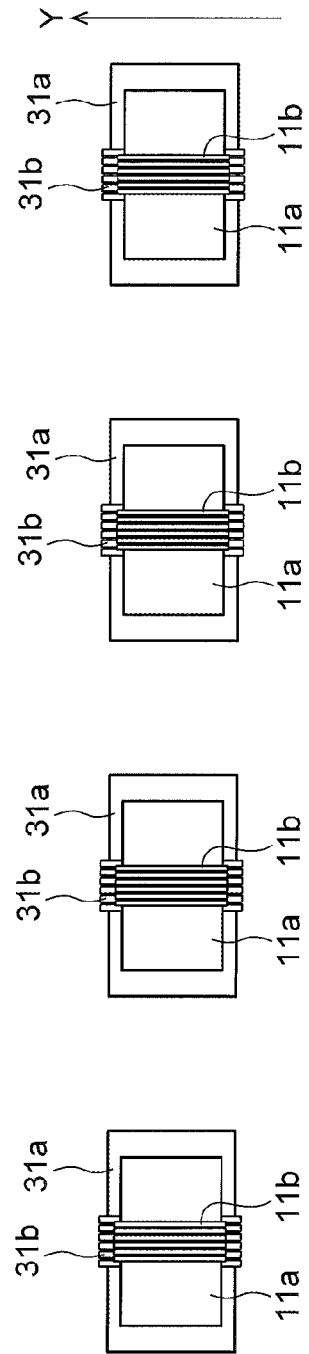
FIG. 2

MOBILE MACHINE, WIRELESS POWER TRANSMISSION SYSTEM, AND WIRELESS POWER TRANSMISSION METHOD

CROSS REFERENCE TO RELATED APPLICATIONS

This application is a Continuation of International Application No. PCT/JP2014/073816, filed on Sep. 9, 2014, the entire contents of which is hereby incorporated by reference.

FIELD

Embodiments described herein relate to a mobile machine, a wireless power transmission system, and a wireless power transmission method.

BACKGROUND

A traditionally advocated coil for wireless power transmission is configured by connecting a right-handed coil and a left-handed coil having the same shape to each other. The amplitude of a leakage magnetic field is proportional to the amplitude of a current flowing in the coil and proportional to the number of windings of the coil. The phase of the leakage magnetic field corresponds to the phase of the current flowing in the coil. As a result, the leakage magnetic field generated from the right-handed coil and the leakage magnetic field generated from the left-handed coil are offset by each other as they have the same amplitude and inverted phases that are inverted with respect to each other, so that the resultant leakage magnetic field after combination can be reduced.

According to this configuration, when the positions of these coils are spaced away from each other in view of avoidance of the impacts of the mutual inductance of the right-handed coil and the left-handed coil, then the wired connection between the two coils is extended, causing increase in the loss, which is a problem found in the state of the art.

As a mode of power transmission that does not rely on the wired connection between the coils, a known method performs power transmission in a wireless manner between multiple resonators each including a coil. As one example, a method is known according to which a plurality of resonators are arranged in an autobus, and wireless power transmission is performed from a plurality of resonators arranged on the ground side to the resonators of the autobus. With regard to the timing at which the wireless power transmission is to take place, the power transmission may be performed at the time of entry and/or exit of passengers while the autobus is stopped. In this context, autobuses may include a kneeling function according to which, taking into account utilization of an autobus by passengers using a wheelchair, the vehicle body is made to be tilted so as to lower the height of the entrance/exit of the autobus. When the wireless power transmission takes place during the stoppage of the autobus with its vehicle body tilted by the kneeling operation, the distances between the resonators of the vehicle body and the corresponding resonators of the ground side may vary depending on the respective resonator pairs. In this case, differences may be created in the coupling coefficients between the resonators, and the differences in the currents flowing in the individual resonator pairs take values that are significantly different from each other. As a result, mere adjustment of the current phase differences of the resonators of the power transmission side may make it difficult or impossible to reduce the leakage magnetic field, which is a problem found in the state of the art.

BRIEF DESCRIPTION OF THE DRAWINGS

FIG. 2 is a diagram illustrating a vehicle resonator and a ground resonator that are arranged to be opposed to each other;

DETAILED DESCRIPTION

According to one embodiment, a mobile machine includes a mobile body and a plurality of power transmission resonators. The mobile body is capable of being tilted in a particular direction such that a distance between a particular part opposed to a travel surface and the travel surface is reduced. The plurality of power transmission resonators are arranged at portions of the particular part of the mobile body, heights of the portions with reference to the travel surface being approximately identical with each other in a state of the mobile body being tilted.

Below, the embodiment of the present invention is described in detail with reference to the drawings.

Figure 1:
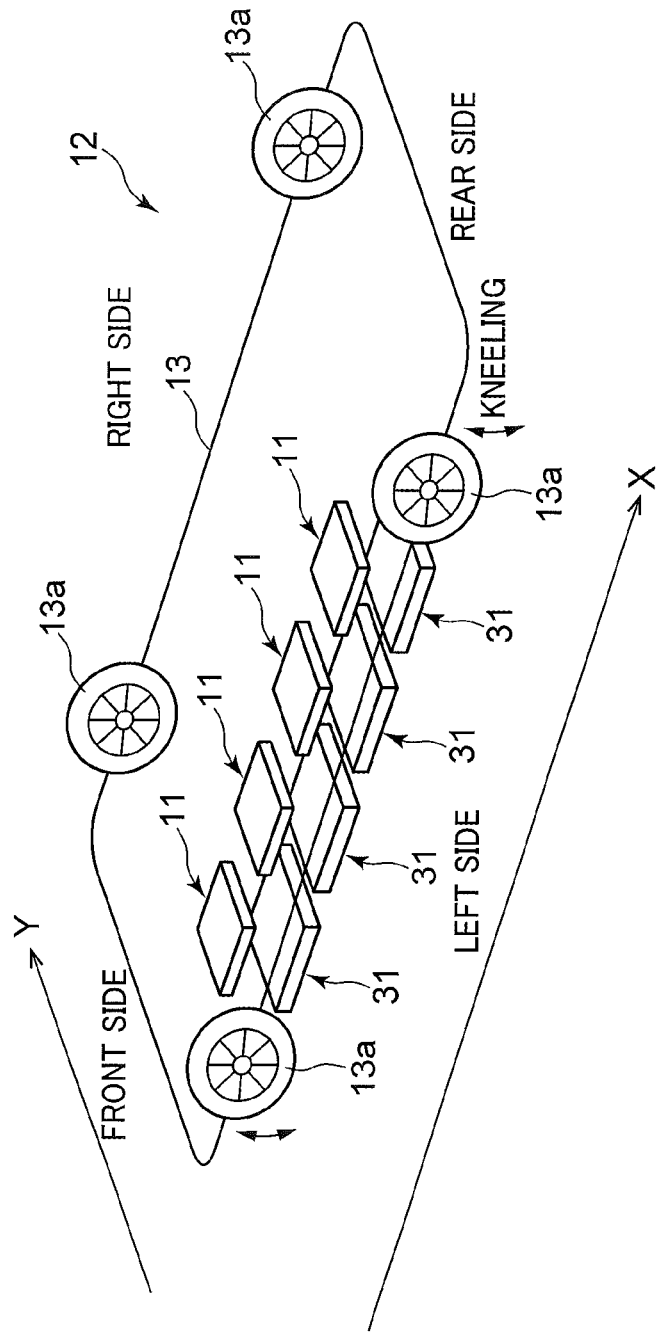
FIG. 1 is a perspective view of a wireless power transmission system according to an embodiment of the present invention.

A perspective view of a wireless power transmission system according to the embodiment of the present invention is illustrated in a schematic manner in FIG. 1.

The wireless power transmission system of FIG. 1 is capable of traveling on a travel surface. The wireless power transmission system includes a mobile machine 12 that has a plurality of power transmission resonators 11, and a plurality of power transmission resonators 31 that are arranged on the travel surface.

Figure 8:
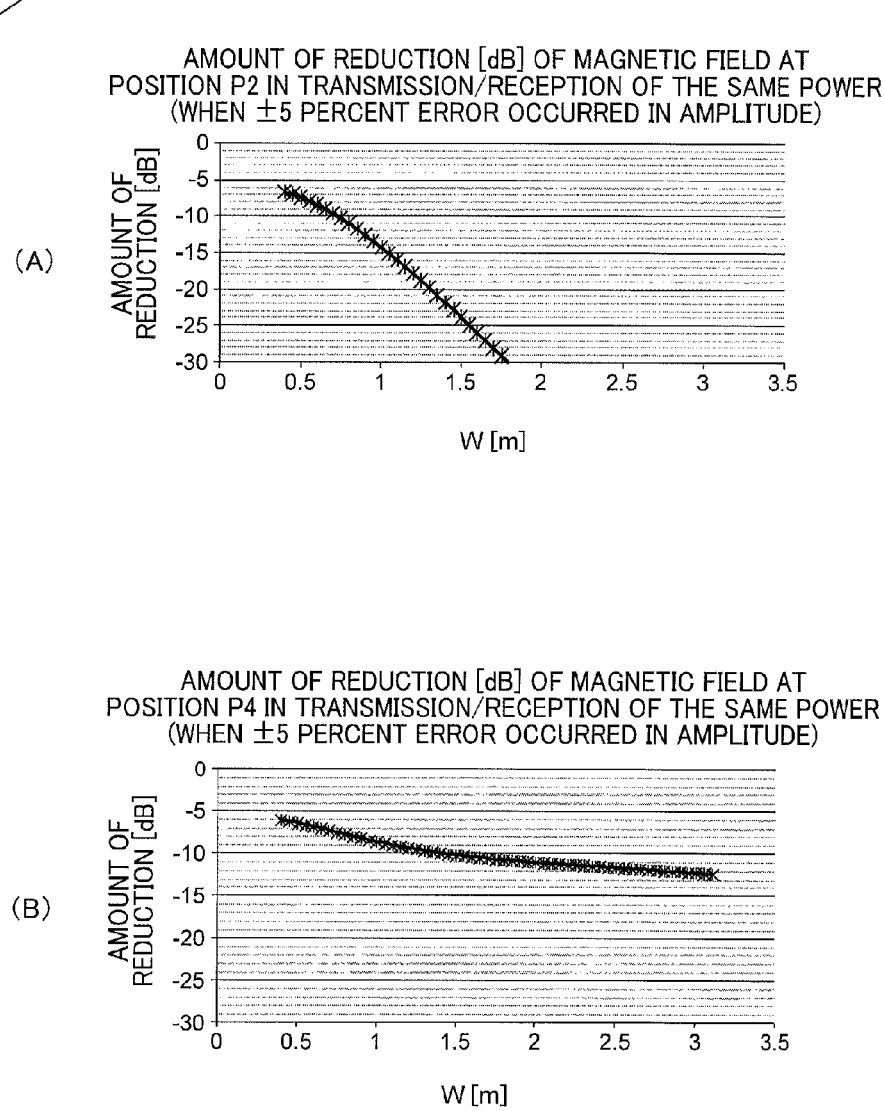
FIG. 8 is a diagram illustrating magnetic field leakage reduction effect in the Y-axis direction according to the embodiment of the present invention.

The mobile machine 12 has as a driving source a storage battery (see FIG. 8 which will be later mentioned) that is capable of storing electrical energy, and travels using the electrical energy of the storage battery. It is contemplated here that the mobile machine 12 may be of a hybrid type that travels on the basis of fuel energy such as gasoline as well as the electrical energy. As an example of the mobile machine 12, vehicles such as an electrical bus, trains, etc., and a Hovercraft™ or the like may be mentioned.

In addition, depending on the types of the mobile machine 12, the travel surface of the mobile machine 12 may be a ground surface, a water surface, or a rail on which a monorail or the like travels. In this embodiment, a vehicle such as an electrical bus or the like is contemplated as the mobile machine 12, and a ground surface is contemplated as the travel surface. In the following paragraphs, the power transmission resonators 11 mounted in the mobile machine 12 is referred to as vehicle resonators and the power transmission resonators 31 mounted on the travel surface is referred to as ground resonators.

In the figure, a state is illustrated in which the mobile machine 12 stops at a predetermined location of the ground surface and the vehicle resonators 11 arranged at a lower portion of the mobile machine 12 and the ground resonators 31 are opposed to each other. The predetermined location may, for example, be a bus stop, a business office, and the like when the mobile machine is an autobus and any location where the ground resonator is arranged in a station, a vehicle base, and the like when the mobile machine is a train.

The mobile machine 12 includes a mobile body 13 and the multiple vehicle resonators 11. The mobile body 13 is capable of traveling on the travel surface using wheels 13a. The mobile machine 12 has a function of making the mobile body 13 tilted in a particular direction so as to reduce the difference between a particular part of the mobile body 13 opposed to (or facing) the travel surface and the travel surface. In addition, the mobile machine 12 has a function of taking the mobile body 13 out of the tilted state and restoring the mobile body 13 in its original position. In this example, the mobile body 13 is allowed to be tilted in the leftward direction as indicated by the arrowed line of FIG. 1 such that the distance between the left portion of the mobile body 13 and the travel surface is reduced, and the mobile body 13 is allowed to be restored in its original position. As the configuration for making the mobile body 13 tilted in the leftward direction, it is contemplated here that the entire mobile body 13 may be configured to be tilted to the left side or only part of the mobile body including the particular part may be configured to be tilted to the left side.

In this embodiment, the operation of making the mobile machine tilted such that the difference between the particular part of the mobile body and the travel surface is reduced is referred to as "kneeling operation." In general, as an example of a mobile machine that includes the kneeling function, an autobus that does not have steps or that is called a "low-floor bus" is known. In a low-floor bus, taking into account utilization of the autobus by passengers using a wheelchair, it is made possible by virtue of the kneeling function to reduce the height of the entrance and/or the exit by making the vehicle body tilted. For example, when the entrance/exit is provided on the left side of the vehicle body, the height of the entrance/exit can be reduced by making the vehicle body tilted in the leftward direction during entry and/or exit of passengers. It should be noted that the term "kneeling operation" is not limited to buses and may be commonly applied to appropriate mobile bodies.

The vehicle resonators 11 are arranged at portions of the particular part of the mobile body 13 where their heights with reference to the travel surface at the time of the kneeling operation are approximately identical with each other. Specifically, the surfaces of the particular part where the vehicle resonators 11 are arranged to have the same height with reference to the travel surface, for example, at least at the time of the kneeling operation where two points of time are contemplated, i.e., the time of the non-kneeling operation and the time of the kneeling operation. Accordingly, the heights with reference to the travel surface up to the individual vehicle resonators 11 are approximately identical with each other. In this example, the vehicle resonators 11 are arranged in parallel with each other or in a single line on the left portion of the mobile body 13 opposed to the travel surface in the front-rear direction of the mobile machine 12 (the direction orthogonal to the leftward direction that is the kneeling direction). Specifically, when the mobile machine 12 is made to be tilted, the vehicle resonators 11 are arranged in a single line at the portion on the side where the height of the mobile body 1 is reduced. In this example, it is contemplated that the arrangement intervals of the vehicle resonators 11 are, though not limited to this example, substantially identical with each other.

As one example, the vehicle resonators 11 are arranged in the part of the lower surface portion of the mobile machine 12 opposed to the travel surface. The lower surface portion of the mobile machine 12 is, by way of example, horizontal to the travel surface at the time of the non-kneeling operation, and the difference between the part of the lower surface portion and the travel surface is made to be reduced by making the vehicle body tilted in the stopped state by the kneeling function. In the illustrated example, the vehicle resonators 11 are four in number, but any number of the vehicle resonators 11 may be provided as long as two or more vehicle resonators 11 are provided. It should be noted that, in this embodiment, the front-rear direction of the mobile machine 12 is defined as an X-axis direction, and the right-left direction is defined as a Y-axis direction.

The vehicle resonators 11 may be arranged to be parallel to the ground resonators 31 at the time of the kneeling operation (such that the magnetic cores, which will be described later, are in parallel with each other), or the vehicle resonator 11 may be tilted with respect to the ground resonator 31 by the amount of the angle of the kneeling operation. When the vehicle resonators 11 are parallel to the ground resonators 31, there will be an advantage that the efficiency in the power transmission can be increased. In view of this, for example, when the lower surface of the mobile machine 12 and the travel surface are in parallel with each other at the time of the non-kneeling operation and the ground resonators 31 are arranged to be parallel to the ground surface, then the vehicle resonators 11 may be arranged in advance to be tilted with respect to the lower surface of the mobile machine 12 in accordance with the angle of the kneeling operation. By virtue of this, it is made possible to make the vehicle resonators 11 and the ground resonators 31 in parallel with each other at the time of the kneeling operation.

The ground resonators 31 are arranged in a single line on the ground surface with the approximately same pitches as the corresponding pitches of the vehicle resonators 11. The ground resonators 31 are arranged such that the ground resonators 31 each correspond to the corresponding one of the vehicle resonators 11 on a one-to-one basis. In a state where the mobile machine 12 is stopped and the ground resonators 31 and the vehicle resonators 11 are made to be opposed to each other, electrical power is transmitted from the ground resonator 31 to the vehicle resonator 11 by magnetic coupling or magnetic resonance. The transmitted electrical power can be taken in by, for example, the storage battery as electrical energy. In the illustrated example, the ground resonators 31 are four in number but any number of the ground resonators 31 may be provided as long as two or more ground resonators 31 are provided in the same or similar manner as the vehicle resonators 11.

It should be noted that the modes of arrangement of the ground resonators 31 include a mode in which an appropriate ground plate is arranged on the ground surface and the ground resonators 31 are arranged on the ground plate and another mode where the ground resonators 31 are stored in an appropriate housing and the housing is arranged on the ground surface as well as the modes where the ground resonators 31 are directly arranged on the ground surface. Modes of arrangement other than these are also possible.

FIG. 2 illustrates a state where the vehicle resonators 11 and the ground resonators 31 are arranged to be opposed to each other in parallel with each other at the time of the kneeling operation. FIGS. 2(A) and 2(B) are side view and a top view, respectively. In FIG. 2, the vehicle resonators 11 and the ground resonators 31 are in parallel with each other. However, as has been described in the foregoing, another configuration is also possible in which the vehicle resonators 11 and the ground resonators 31 are not in parallel with each other at the time of the kneeling operation.

The specific configurations of the vehicle resonators 11 and the ground resonators 31 are described using FIG. 2. The vehicle resonators 11 each include a magnetic core 11$a$ having an approximately flat plate-like shape, and a coil 11$b$ wound around the magnetic core 11$a$. The ground resonators 31 each include a magnetic core 31$a$ having an approximately flat plate-like shape, and a coil 31$b$ wound around the magnetic core 31$a$.

The vehicle resonators 11 are arranged such that the wind direction of their coil 11$b$ are substantially parallel to the right-left direction (Y-axis direction) of the mobile machine 12. By virtue of this arrangement, it is made possible to increase the tolerance to the positional deviation in the Y-axis direction at the time of the power transmission between the resonator of the ground surface and the resonator of the vehicle which are opposed to each other. Specifically, it is often more difficult for a driver of an autobus or the like to adjust the position of the vehicle he/she is driving in the right-left direction than to adjust it in the front-rear direction. In view of this, by adopting a resonance arrangement that is tolerant to the positional deviation in the right-left direction, it is made possible to achieve highly efficient power transmission regardless of some positional deviation in the right-left direction.

In the example of FIG. 2, the magnetic cores 11$a$ and 31$a$ have a approximately flat plate-like shape, but this is merely one example. The magnetic cores may have any appropriate shape. For example, the magnetic cores may have a planar shape such as an H-shape or the like. In addition, it may also be contemplated that the magnetic cores are each divided into a plurality of strip-like segments in the X-axis direction and the individual segments are arranged to be spaced from each other with an interval in between and aligned in the Y-axis direction. In addition, the thicknesses of the magnetic cores may vary depending on the positions in the X-axis direction or the Y-axis direction. It will be appreciated that any configuration other than those described herein may be adopted. Also, in the example of FIG. 2, one coil is wound around one magnetic core, but it may also be contemplated that a plurality of coils are wound around one magnetic core such that the coils are spaced from each other with an interval in between. In addition, the sizes of the vehicle resonators 11 and the ground resonators 31 may be different from each other or they may have the same size. In the illustrated example, a case is described in which the vehicle resonator 11 is smaller than the ground resonator 31.

For power transmission from the ground resonators 31 installed on the ground surface to the vehicle resonators 11 and for electric charge of the storage battery provided in the vehicle (electrical bus, etc.), a mode is contemplated according to which the electric charge is performed using the stoppage time at the time of entrance and/or exit of passengers. In this embodiment, by virtue of adjustment of the arrangement positions of the vehicle resonators 11 and the ground resonators 31, power transmission that can reduce the magnetic field leakage is performed even when the power transmission is performed in a state where the mobile machine makes the kneeling operation, which is one of the features of this embodiment. This is described in detail below.

Figure 3:
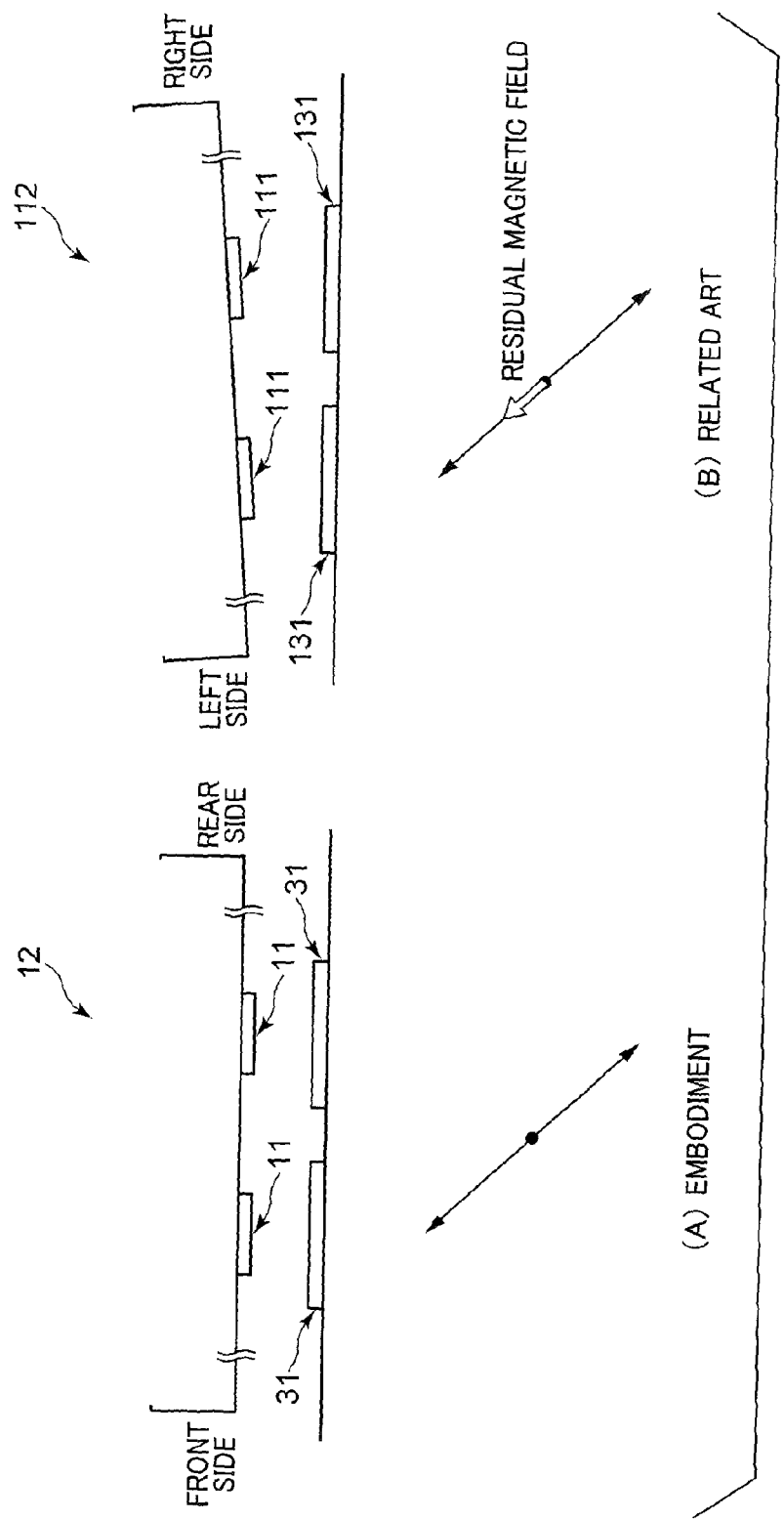
FIG. 3 is a diagram illustrating the distance between the vehicle resonator and the ground resonator at the time of kneeling operation by way of comparison of this embodiment with a related art.

FIG. 3(B) illustrates a front view (a diagram viewed in the X-axis direction of FIG. 1) of a mobile machine in a related art. In an autobus 112 that has a function of kneeling in its leftward direction, vehicle resonators 111 are arranged in a single line in a left-to-right direction. Also, ground side resonators 131 are arranged in a single line on the ground side with the same pitches as those of the vehicle resonators 111. In this case, the distance between the left-side resonator pair (111, 131) is close but the distance of the right-side resonator pair (111, 131) becomes large, so that, in the power transmission from the ground side to the vehicle side, variation is created in the coupling coefficients between the resonators depending on the specific resonator pairs. As a result, the difference in the currents flowing in the resonator pairs will become large and the currents will take values that are significantly different from each other. Specifically, the mutual inductances of the resonator pairs and the self-inductance of individual resonators assume values that are different from each other. Hence, the difference in the amplitudes of the magnetic fields between or among the resonator pairs becomes large, causing the problem that it may become difficult to sufficiently reduce the magnetic field leakage even when phase control of the power transmission current is implemented. In other words, it may become difficult to adjust the phase difference of the power transmission currents for reduction of the leakage magnetic field, or it may become impossible to reduce the leakage magnetic field only relying on the adjustment of the phase difference of the power transmission currents. Accordingly, reduction in the magnetic field leakage becomes insufficient, and a residual magnetic field as illustrated in FIG. 3(B) is generated.

Meanwhile, FIG. 3(A) illustrates a side view of the mobile machine according to this embodiment (a diagram viewed in the Y-axis direction of FIG. 1). The vehicle resonators 11 are arranged in a single line in the X-axis direction in the left portion of the vehicle body, i.e., the particular part that moves close to the ground surface when the vehicle body is tilted to the left side. Specifically, the vehicle resonators 11 are arranged in the left portion of the vehicle body on a straight line in the direction from the front side to the rear side of the vehicle body. The portions where the vehicle resonators 11 are arranged have the substantially same distance from the travel surface. By virtue of this, even at the time of the kneeling operation, the distances between the resonators of the vehicle side and the resonators of the ground side of the resonator pairs become substantially identical with each other between the resonator pairs. Accordingly, when substantially the same electrical power is transmitted in parallel by each of the resonator pairs, then the currents flowing in each of the resonator pairs become substantially identical with each other. By virtue of this, it is facilitated to offset the magnetic fields by each other by inverting the phases of the power transmission currents between two adjacent resonator pairs with respect to each other. In addition, when the distances between the resonators of the respective resonator pairs are substantially identical with each other, then the change in the resonance frequency, i.e., the deviation from the power transmission frequency also becomes substantially the same. By virtue of this, the phase difference of the current of the resonator on the power reception side also becomes substantially identical with the phase difference of the power transmission current, and it is facilitated to offset the magnetic fields due to the currents flowing in the power reception resonators. In other words, the mutual inductances of the resonator pairs take the same or similar value and the individual self-inductances take the same or similar value, so that the difference in amplitudes of the magnetic fields becomes small and thus the magnetic field leakage can be more efficiently reduced by the phase control for the power transmission current.

Figure 4:
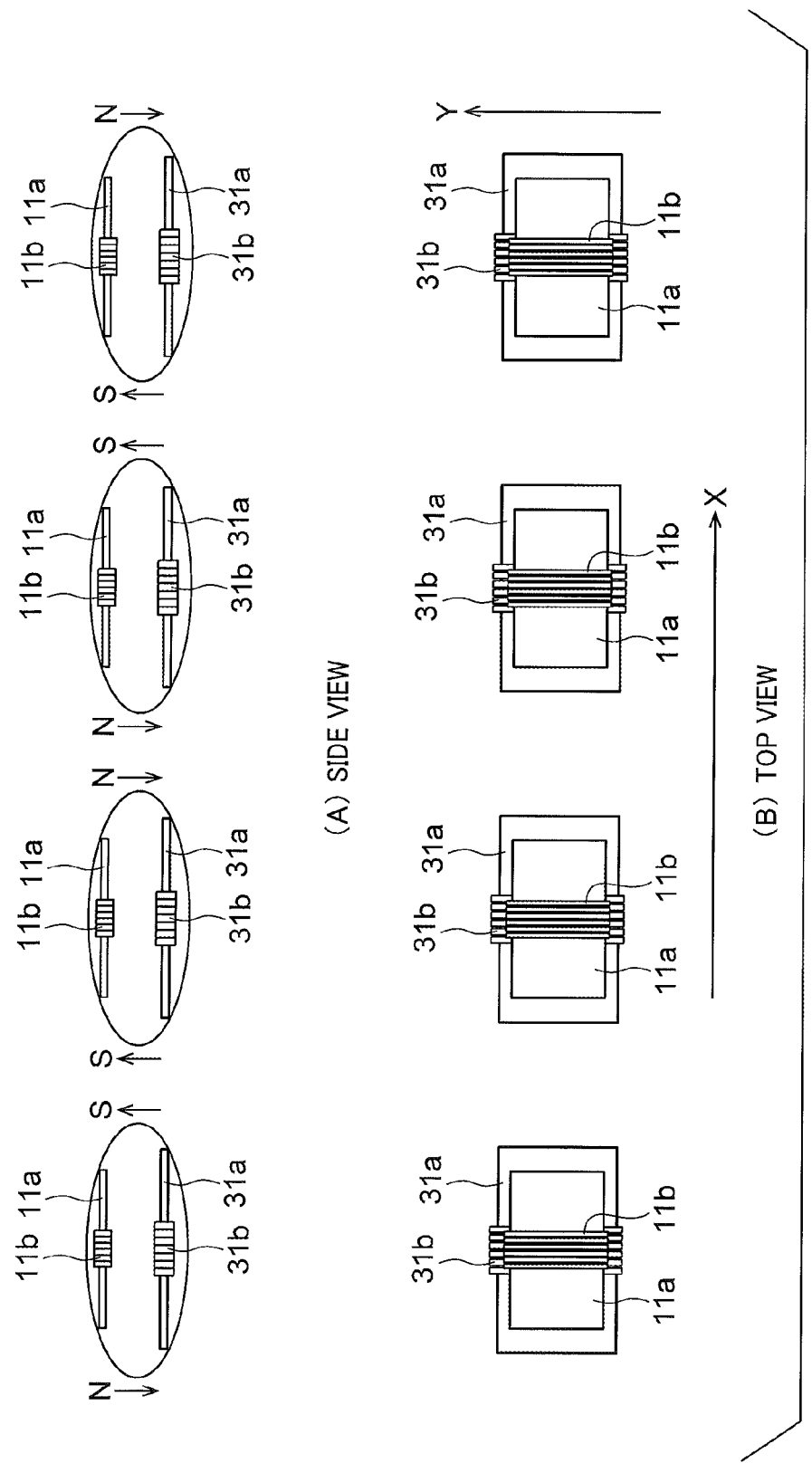
FIG. 4 is a diagram illustrating the relationship between a current applied to a coil and a magnetic flux.

FIG. 4 illustrates the relationship between the current applied to the coil and the magnetic flux. This figure is formed by adding to FIG. 2(A) ellipses each indicative of the magnetic flux and arrowed lines each indicative of the direction of the magnetic field. An "N" represents the North Pole and an "S" represents the south pole. In the illustrated example, from among the four resonator pairs, the phases of the currents applied to the left-side two resonator pairs are controlled such that the phases are different from each other by 180 degrees, and the phases of the currents applied to the right-side two resonator pairs are controlled such that the phases are different from each other by 180 degrees. By virtue of this, the directions of the magnetic fields can be inverted between the resonator pairs adjacent to each other.

Figure 5:
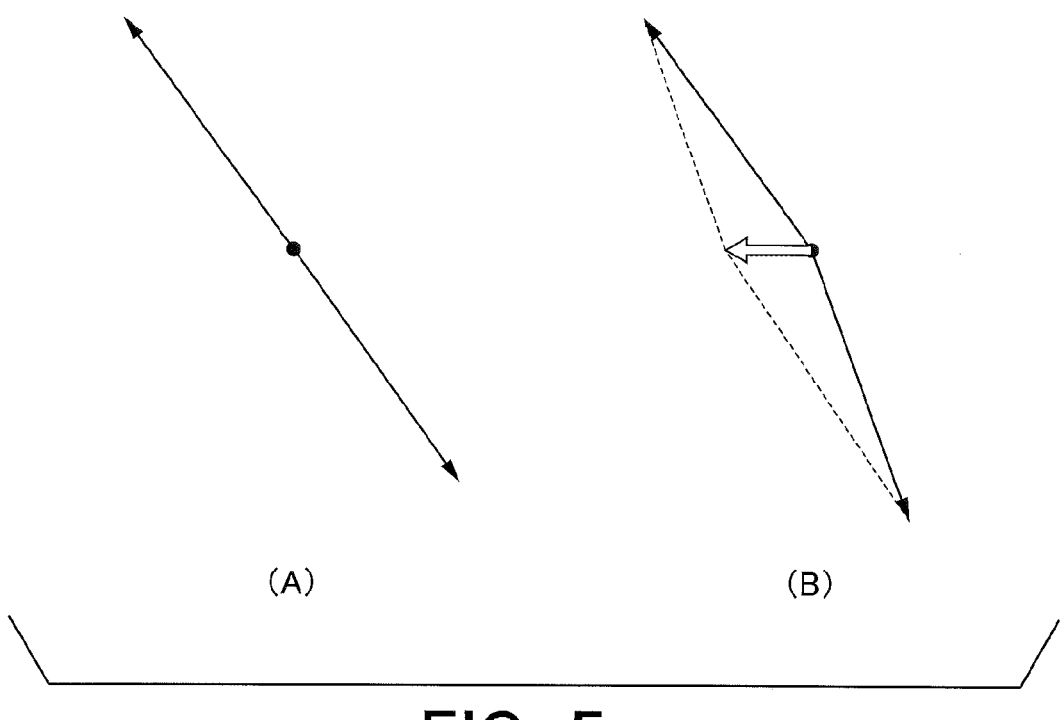
FIG. 5 is a diagram illustrating a difference of the magnetic field caused by the current difference and magnetic field leakage due to deviation of a phase difference from 180 degrees.

FIG. 5 is a diagram that illustrates the difference in the magnetic field due to the current difference and the leakage magnetic field due to the deviation of the phase difference from 180 degrees. As illustrated in the vector diagram on the left side of FIG. 5(A), when the amplitudes of the currents of the two resonator pairs are identical with each other and the phase difference becomes 180 degrees, then the magnetic fields occurring at a sufficiently distant point by the respective currents are offset by each other. In addition, as illustrated in the vector diagram on the right side of FIG. 5(B), it is appreciated that, even when the current amplitudes are slightly different from each other and the phase difference is slightly deviated from 180 degrees, the magnetic fields occurring at a sufficiently distant point by the respective currents become significantly low compared with the magnetic field that is only generated by each current.

Figure 6:
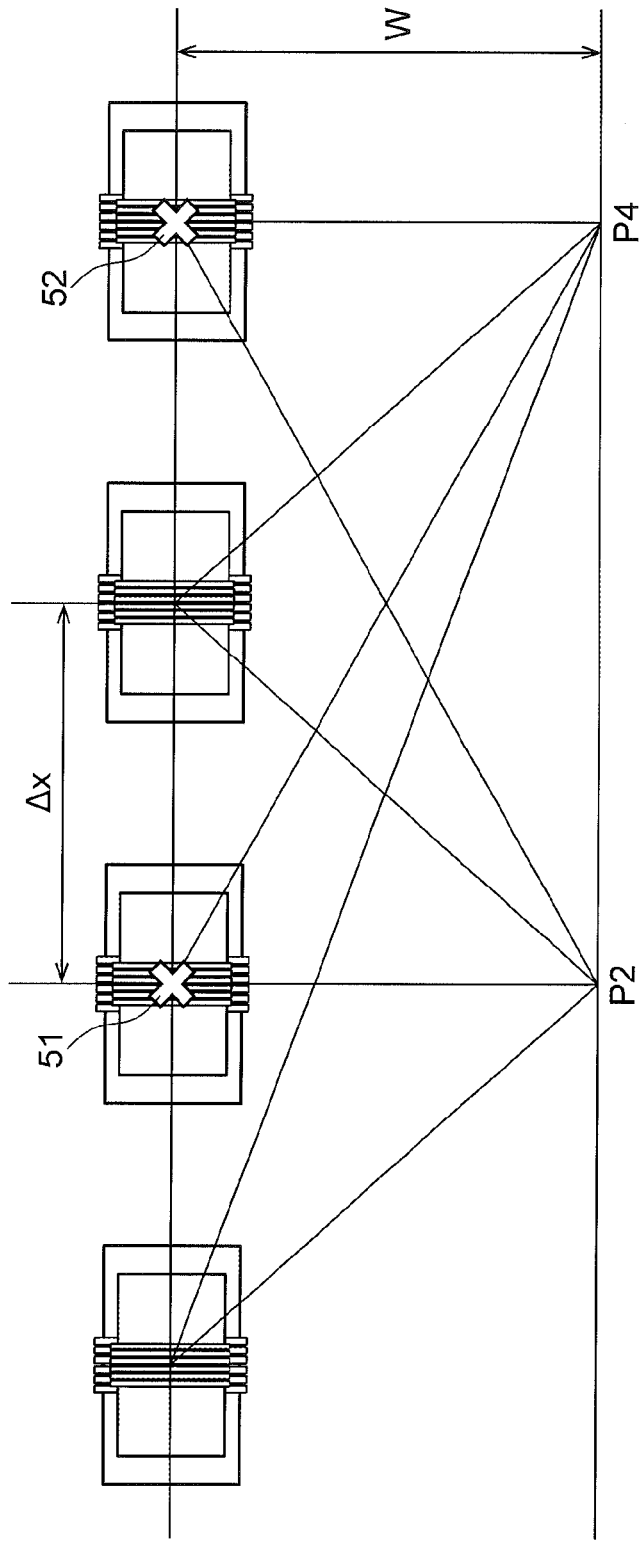
FIG. 6 is a diagram illustrating magnetic field leakage reduction effect in a Y-axis direction according to the embodiment of the present invention.
Figure 7:
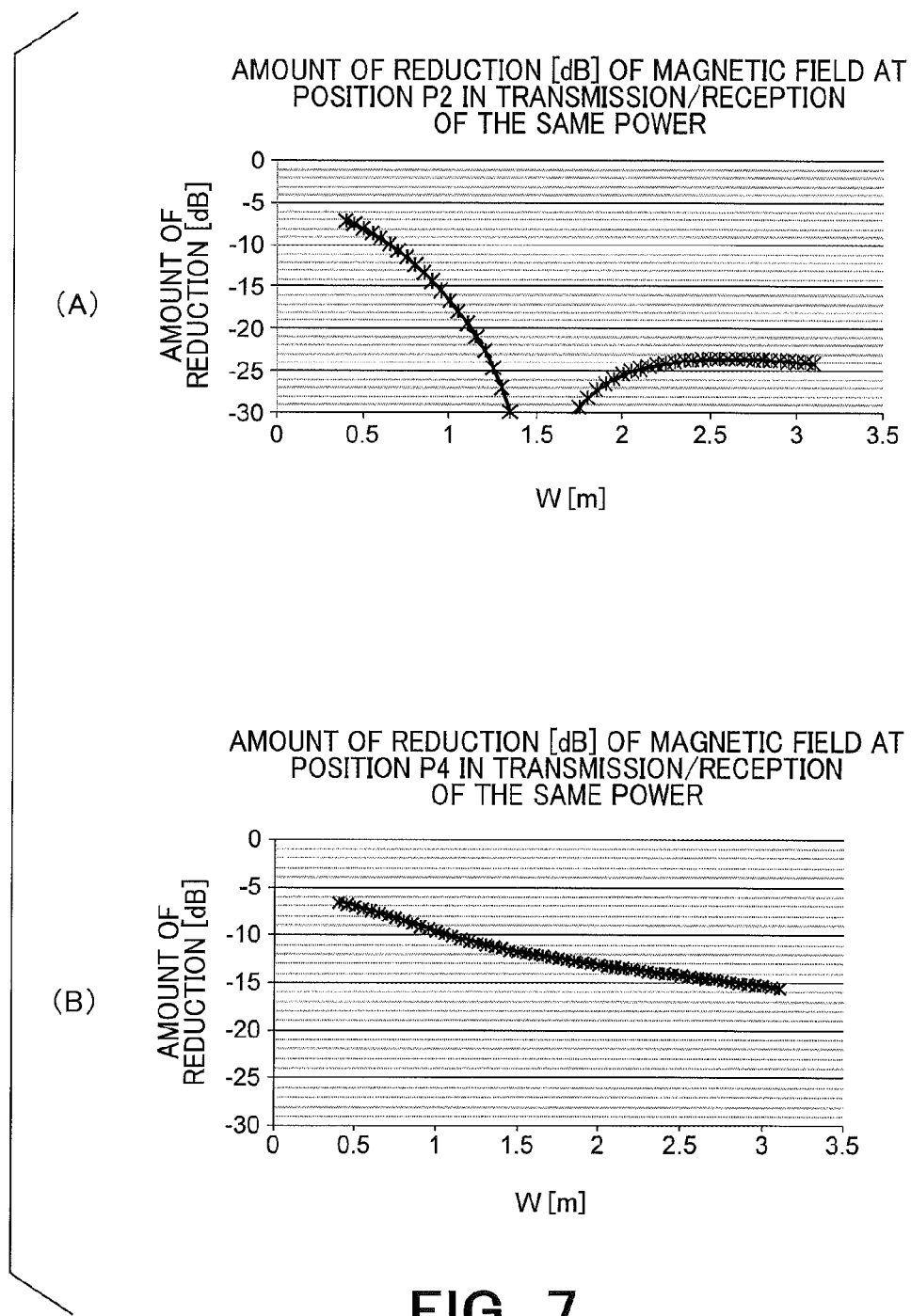
FIG. 7 is a diagram illustrating magnetic field leakage reduction effect in the Y-axis direction according to the embodiment of the present invention.

FIGS. 6 and 7 are diagrams for illustration of the extent to which the magnetic fields at the positions P2 and P4 of FIG. 6 are attenuated by this embodiment. Specifically, FIGS. 6 and 7 are diagrams for illustration of the extent to which the magnetic fields at the positions P2 and P4 are attenuated when the electrical power is transmitted and received by four resonator pairs in comparison with a case where electrical power having a magnitude four times as large as that of the former electrical power is transmitted and received by one single resonator pair.

The difference ΔX between the resonator pairs in the X-axis direction is given as 0.9 meters. The position P2 is a position that is away from the center 51 of the second resonator pair from the left by a distance W in the Y-axis direction. The position P4 is a position that is away from the center 52 of the rightmost resonator pair by a distance W in the Y-axis direction.

FIG. 7(A) is a graph that illustrates the amount of decrease in the magnetic field at the position P2 in comparison with a case where certain electrical power is transmitted and received only using the second resonator pair from the left in FIG. 6, in a case where electrical power is transmitted and received using four resonator pairs each transmitting and receiving a fourth of the same electrical power. The interrupted portion in the graph indicates the section where the value is less than −30 dB.

FIG. 7(B) is a graph that illustrates the amount of decrease in the magnetic field at the position P4 in comparison with a case where certain electrical power is transmitted and received only using the rightmost resonator pair in FIG. 6, in a case where electrical power is transmitted and received using four resonator pairs each transmitting and receiving a fourth of the same electrical power.

It is appreciated both in FIG. 7(A) and FIG. 7(B) that, for example, significant attenuation can be obtained at a position whose distance W is 3 meters.

FIG. 8(A) illustrates a graph which is the result of calculation in a case where the difference in the current amplitudes between the resonator pairs adjacent to each other is ±5 percent in a case where calculation in the same or similar manner as FIG. 7(A) is performed. FIG. 8(B) illustrates a graph which is the result of calculation in a case where the difference in the current amplitude between the resonator pairs adjacent to each other is ±5 percent in a case where calculation in the same or similar manner as FIG. 7(B) is performed. It is appreciated that, for example, a significantly large attenuation can be obtained at a position whose distance W is 3 meters even when such a slight deviation in the amplitude occurs.

Figure 9:
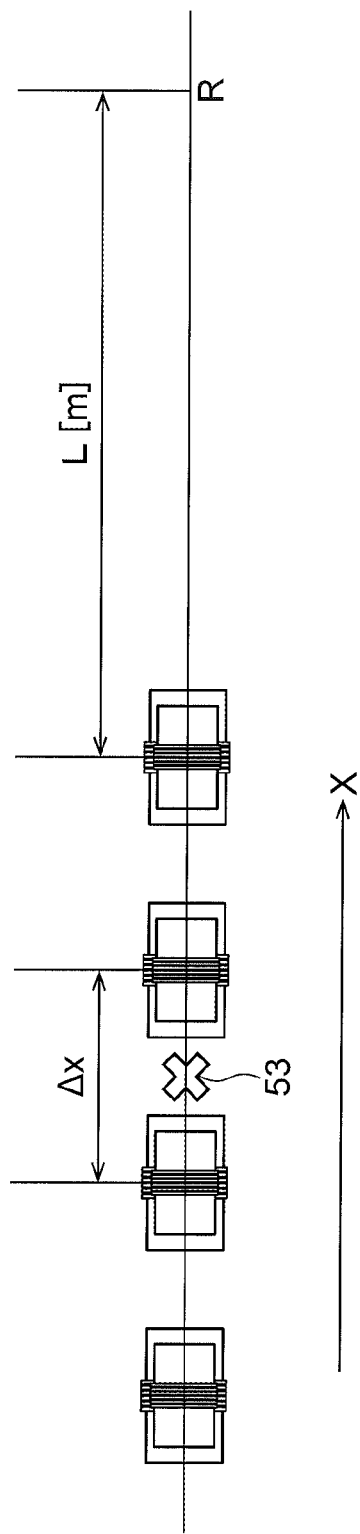
FIG. 9 is a diagram illustrating magnetic field leakage reduction effect in an X-axis direction according to the embodiment of the present invention.
Figure 10:
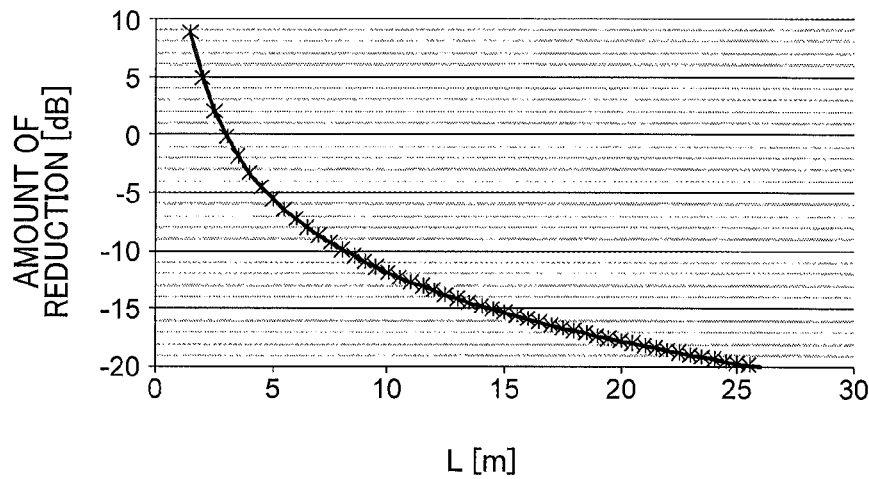
FIG. 10 is a diagram illustrating magnetic field leakage reduction effect in the X-axis direction according to the embodiment of the present invention.

FIGS. 9 and 10 are diagrams that illustrate the effect associated with the extent to which the magnetic field at a position R is attenuated in a case where the same electrical power is respectively transmitted and received by four resonator pairs, in comparison with a case where electrical power whose magnitude is four times as large as the same electrical power is transmitted and received by one resonator pair (not shown) arranged at a position 53. The distance Δx between the four resonator pairs is given as 0.9 meters. In addition, the position R is a position that is away from the center of the rightmost resonator pair by L (meters) in the X-axis direction.

FIG. 10 illustrates a graph that provides the result of calculation of the amount of decrease in the magnetic field at the position R, in comparison with a case where certain electrical power is transmitted and received by one resonator pair (not shown) arranged at the position 53 of FIG. 9, in a case where electrical power whose magnitude is a fourth of that of the certain electrical power is transmitted and received by each of the four resonator pairs. For example, it is appreciated that a large attenuation can be obtained at a position whose distance L is 10 meters.

Figure 11:
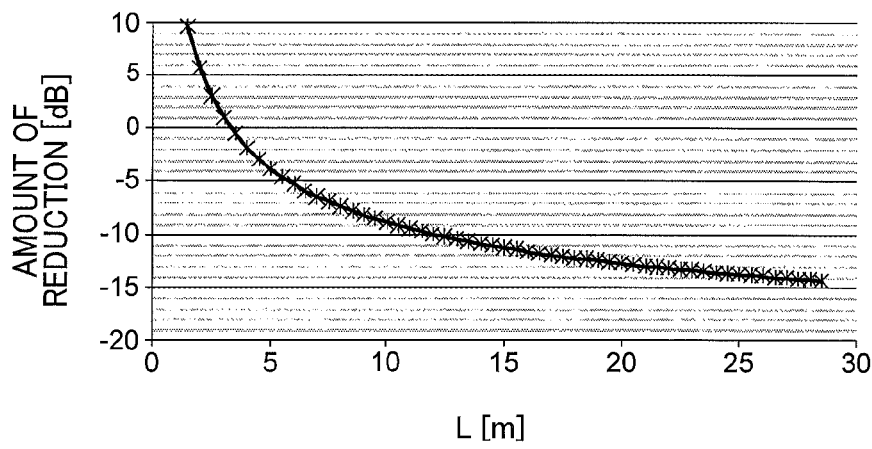
FIG. 11 is a diagram illustrating magnetic field leakage reduction effect in the X-axis direction according to the embodiment of the present invention.

FIG. 11 illustrates a graph that indicates the result of the calculation in a case where there is a difference of ±5 percent in the current amplitudes of the resonator pairs adjacent to each other in a case where calculation that is the same or similar to that of FIG. 10 is performed. It is appreciated that, even when a slight deviation in the amplitudes occurs in this manner, a significantly large attenuation can be obtained, for example, at a position whose difference L is 10 meters.

In this embodiment, while the arrangement of the vehicle resonators has been illustrated in FIG. 1 according to which the mobile machine performs the kneeling operation in the leftward direction, the vehicle resonators should be arranged in a similar manner when the kneeling operation is performed in the rightward direction, in the frontward direction, or in the rearward direction. Specifically, in these cases, the vehicle resonators should be arranged in portions of the particular part where the distances thereof from the travel surface are identical with each other, the particular part being a part where the distance with respect to the travel surface is reduced at the time of the kneeling operation. For example, the vehicle resonators should be arranged in a single line in the direction approximately orthogonal to the direction of this kneeling operation.

Figure 12:
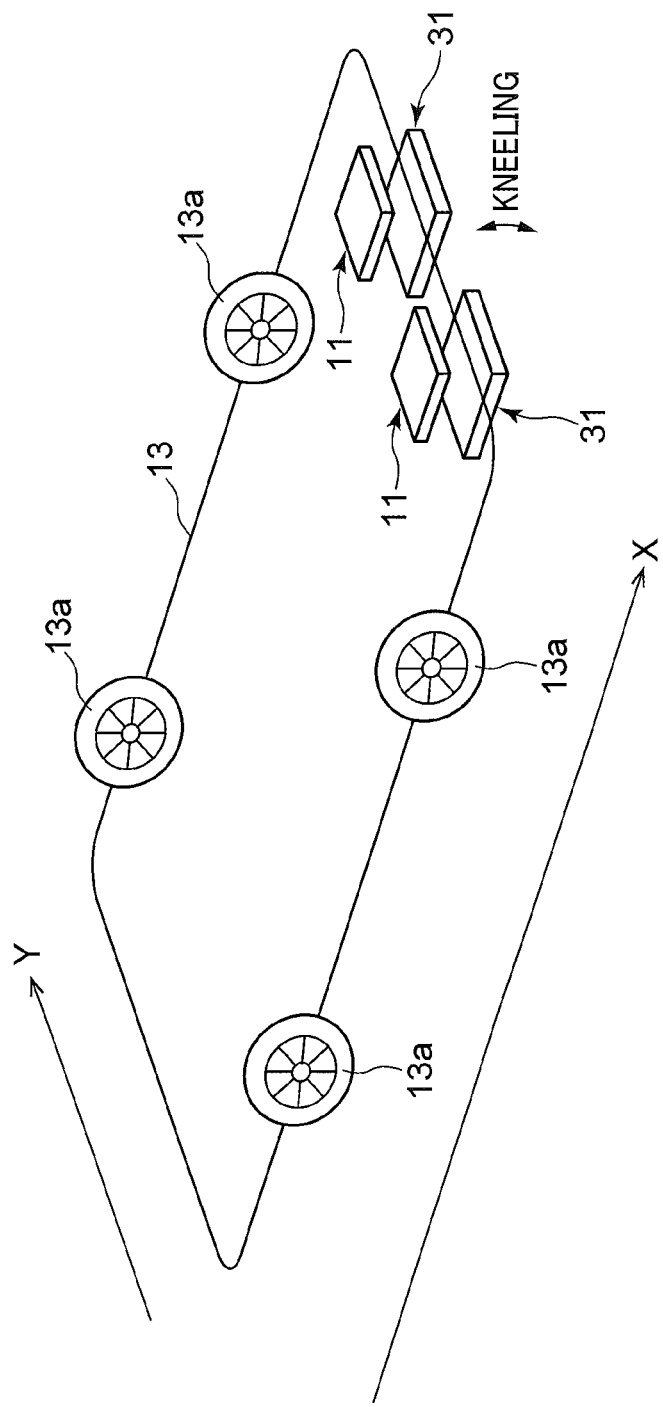
FIG. 12 is a diagram illustrating arrangement of vehicle resonators in a case where the kneeling operation takes place to the front side or the rear side.
Figure 13:
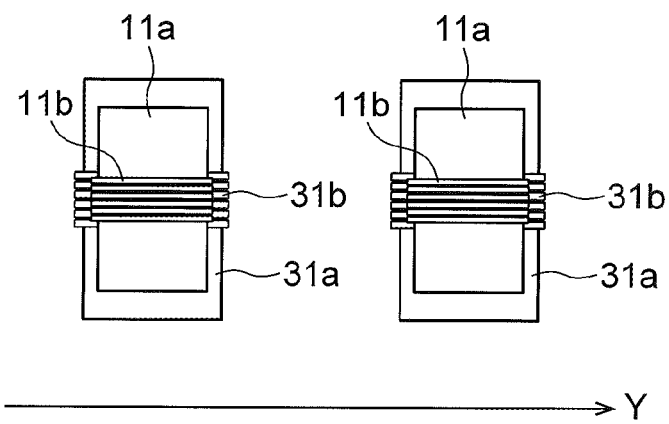
FIG. 13 is a diagram illustrating a state where the vehicle resonator in accordance with the arrangement of FIG. 12 is opposed to the ground resonators.

FIG. 12 is a diagram that illustrates the arrangement of the vehicle resonators of the mobile machine in a case where the mobile machine performs the kneeling operation in the frontward direction or the rearward direction. The state where the vehicle resonators 11 and the ground resonators 31 in FIG. 12 are opposed to each other is illustrated in the top view of FIG. 13. FIG. 13 illustrates a state where the vehicle resonators 11 and the ground resonators 31 are opposed to each other and in parallel with each other at the time of the kneeling operation. It should be noted, as in the case of FIG. 2, that a configuration is also possible according to which the vehicle resonators 11 and the ground resonators 31 are not in parallel with each other at the time of the kneeling operation.

The distances between the resonators of the ground side and the resonators of the vehicle side of the respective resonator pairs are made to be substantially identical with each other. The vehicle resonators 11 are arranged such that the wind direction of the coil 11b is substantially parallel to the right-left direction (Y-axis direction) of the mobile machine. By virtue of this, as has been described in the foregoing, it is made possible to increase the tolerance to the positional deviation in the Y-axis direction.

In the above-described embodiment, the example has been described in which four or two resonators are respectively arranged on the vehicle side and the ground side, respectively. When four resonators are provided, as has been described in the foregoing, the example has been described in which the reverse-phase current phases are provided for the left-side two resonator pairs from among the four resonator pairs with respect to each other and reverse-phase current phases are provided for the right-side two resonator pairs with respect to each other, and thus the magnetic field leakage to the distant point is reduced. When two resonators are provided, as one example, by providing reverse-phase current phases for the two resonator pairs with respect to each other, the magnetic field leakage can be reduced in the same or similar manner. Meanwhile, when three resonators are respectively arranged on the vehicle side and the ground side, as illustrated below, the current phase control should be implemented.

Figure 14:
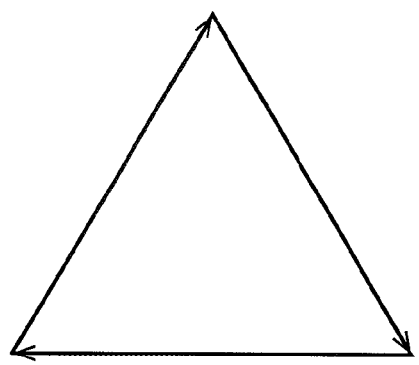
FIG. 14 is a diagram illustrating an example of the current phase control in a case where three resonators are arranged on the vehicle side and another three resonators on the ground side.

FIG. 14 illustrates an example of control of the current phase in a case where three resonators are arranged on the vehicle side and another three resonators are arranged on the ground side. When the amplitudes of the power transmission currents of the resonator pairs are identical with each other, phase differences by 120 degrees with respect to each other should be respectively given to the power transmission currents in order to make the sum with the complex number substantially zero. The arrowed lines illustrated in FIG. 14 represent the amplitudes and the phases of the power transmission currents, and each of the amplitudes is the same as that of the other amplitudes, with the phases thereof being deviated by 120 degrees from each other.

Figure 15:
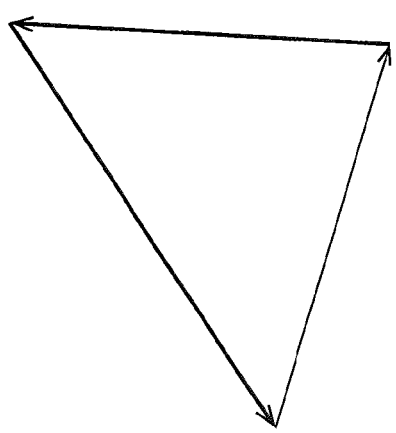
FIG. 15 is a diagram illustrating another example of the current phase control in a case where three resonators are arranged on the vehicle side and another three resonators on the ground side.

FIG. 15 illustrates another example of the control of the current phase in a case where three resonators are used on the vehicle side and another three resonators are used on the ground side. This is an example of cases where the amplitudes of the power transmission currents of the individual resonator pairs are slightly different from each other. In this case, it is possible to reduce the synthetic magnetic field at a distant place by controlling the phase differences to be slightly deviated from the 120 degrees, in accordance with the difference in the currents so that the vector sum becomes zero. The arrowed lines illustrated in FIG. 15 represent the amplitudes and the phases of the power transmission currents, the amplitudes are different from each other, and the phases are slightly deviated from the 120 degrees.

Figure 16:
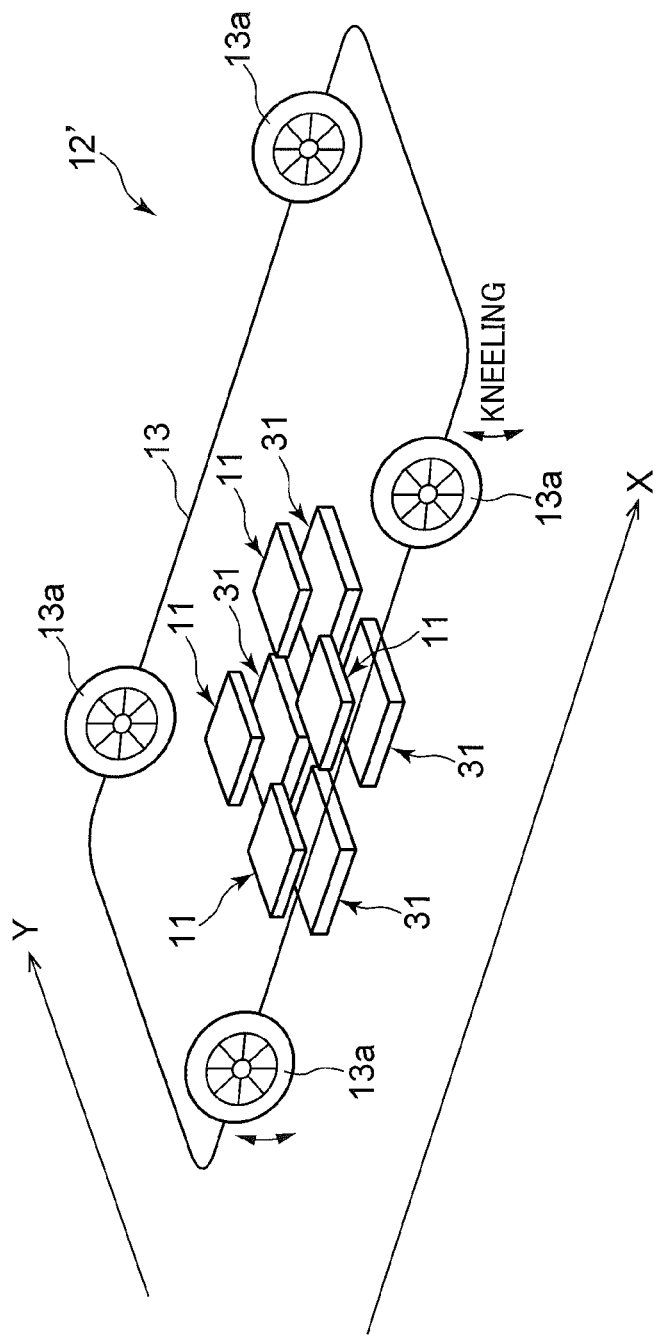
FIG. 16 is a perspective view of another example of the wireless power transmission system according to the embodiment of the present invention.

The vehicle resonators are arranged in a single line in the vehicle's front-rear direction (X-axis direction) according to the configuration illustrated in FIG. 1. However, when there exist two or more areas where the distances with respect to the travel surface are substantially identical with each other in the right-left direction (Y-axis direction) in the particular part at which the distance with respect to the travel surface is reduced at the time of the kneeling operation, to the extent that the vehicle resonators can be arranged at appropriate intervals, then a configuration is also possible according to which a plurality of rows of the vehicle resonators are arranged in the Y-axis direction. For example, as illustrated in FIG. 16, a configuration is also possible according to which two rows of the vehicle resonators arranged in the X-axis direction are provided in the Y-axis direction.

Figure 17:
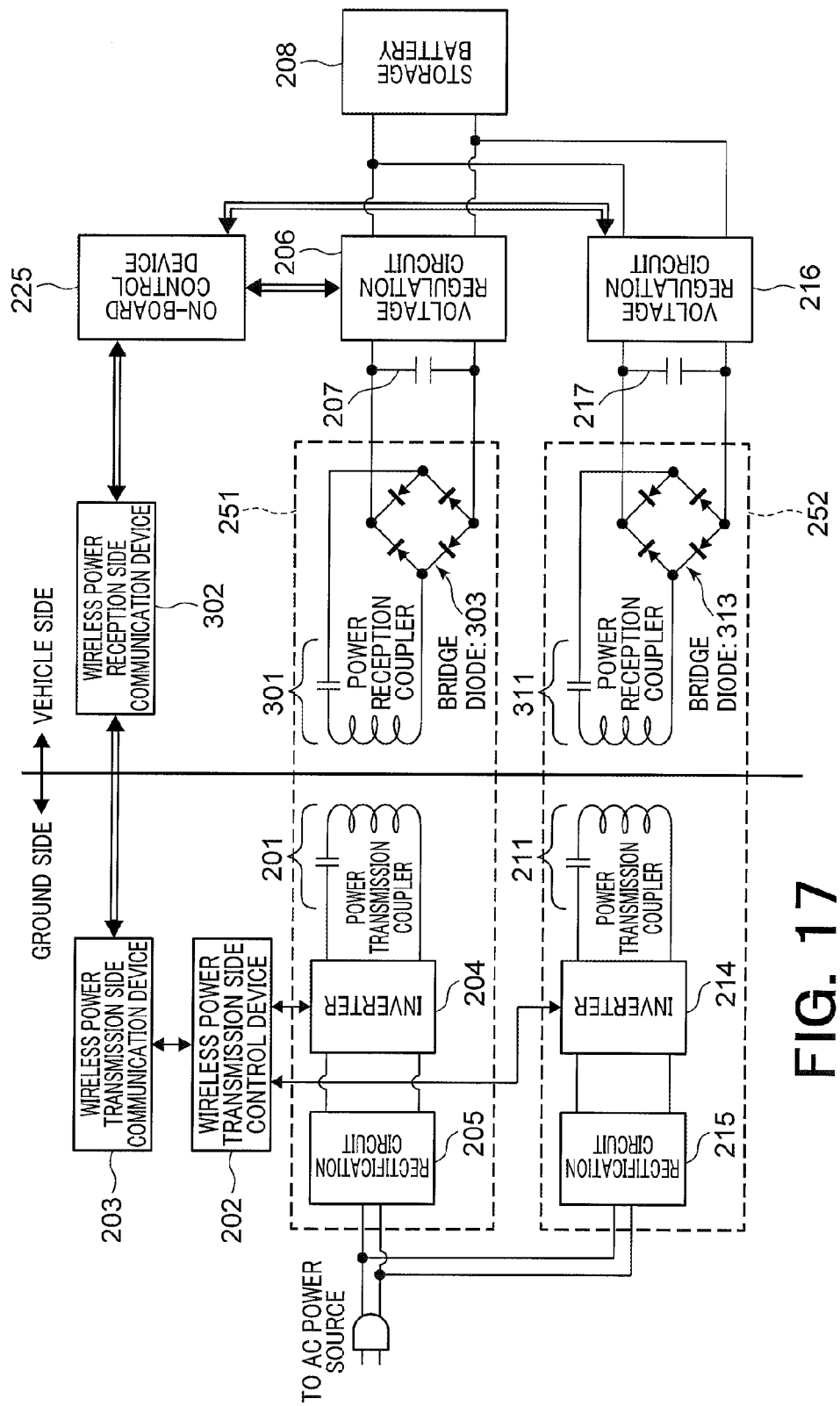
FIG. 17 is a functional block diagram of an example of the wireless power transmission system according to the embodiment of the present invention.

FIG. 17 illustrates a functional block diagram of the wireless power transmission system according to the embodiment of the present invention. Here, a configuration is described in which two resonators are arranged on the vehicle side and another two resonators are arranged on the ground side. Also in the case of three resonators, it is possible to configure the system in the same or similar manner by increasing the number of channels of the wireless power transmission. Here, the resonators of the power transmission side (ground side) are referred to as power transmission couplers, and the resonators of the power reception side (vehicle side) are referred to as power reception couplers.

The wireless power transmission system of FIG. 17 includes two wireless power transfer units 251 and 252, input capacitors 207 and 217, voltage regulation circuits 206 and 216, a wireless power transmission side control device 202, a wireless power transmission side communication device 203, a wireless power reception side communication device 302, an on-board control device 225, and a storage battery 208.

The wireless power transfer unit 251 includes a rectification circuit 205, an inverter 204, a power transmission coupler 201, a power reception coupler 301, and a bridge diode 303. The wireless power transfer unit 252 includes a rectification circuit 215, an inverter 214, a power transmission coupler 211, a power reception coupler 311, and a bridge diode 313.

The power reception coupler 301, the bridge diode 303, the input capacitor 207, the voltage regulation circuit 206, the power reception coupler 311, the bridge diode 313, the input capacitor 217, the voltage regulation circuit 216, the storage battery 208, the on-board control device 225, and the wireless power reception side communication device 302 are mounted in the vehicle (mobile machine).

The rectification circuit 205, the inverter 204, the power transmission coupler 201, the rectification circuit 215, the inverter 214, the power transmission coupler 211, the wireless power transmission side communication device 203, and the wireless power transmission side control device 202 are arranged on the ground side.

The rectification circuit 205 of the wireless power transfer unit 251 is connected to an external commercial power source. The rectification circuit 205 is configured to generate a DC current from an AC current of the commercial power source and supplies the DC current to the inverter 204.

The inverter 204 is configured to convert the voltage and the frequency of the DC power supplied from the rectification circuit 205 in accordance with the control by the wireless power transmission side control device 202 and to generate high-frequency AC power. The inverter 204 is also configured to input the generated high-frequency AC power to the power transmission coupler 201. As the method of control by the wireless power transmission side control device 202, for example, a configuration is possible according to which a pulse-width modulation signal (pulse-width modulation gate signal) is input to the inverter 204. In this case, it may be contemplated to use the pulse-width modulation gate signal as an input and use the inverter circuit that outputs a high-voltage, large current power in accordance with the pulse width thereof.

The wireless power transmission side control device 202 is configured to receive instructions from the on-board control device 15 via wireless communications between the wireless power transmission side communication device 203 and the wireless power reception side communication device 302 and perform operation in accordance with the instructions.

The power transmission coupler 201 is configured to generate a high-frequency electromagnetic field in accordance with the high-frequency AC power input from the inverter 204, and transmit the high-frequency AC power wirelessly in a non-contact manner to the power reception coupler 301.

The power reception coupler 301 is configured to wirelessly receive high-frequency AC power from the power transmission coupler 201 and output the received high-frequency AC power to the bridge diode 303. The bridge diode 303 is configured to rectify the high-frequency AC power from the power reception coupler 301. The output power of the bridge diode 303 is input to the voltage regulation circuit 206. It is contemplated that an input capacitor 207 is provided as an input buffer in the input side of the voltage regulation circuit 206. The bridge diode 303 needs to have sufficient reverse voltage withstand voltage for rectification of high-voltage power, as one example, in the order of several hundreds of volts. The voltage regulation circuit 206 is configured to generate an appropriate DC voltage in accordance with the storage battery 208 and supply the electrical power with this voltage to the storage battery 208.

The rectification circuit 215, the inverter 214, the power transmission coupler 211, the power reception coupler 311, and the bridge diode 313 of the wireless power transfer unit 252 have the elements of the same names and the same functions as those of the wireless power transfer unit 251, and accordingly redundant explanation thereof is omitted. Also, the input capacitor 217 and the voltage regulation circuit 216 each have the functions that are identical with those of the input capacitor 207 and the voltage regulation circuit 206, and accordingly redundant explanation thereof is omitted. The storage battery 208 is configured to perform electric charge of the electrical energy on the basis of the combination of the electrical power supplied from the voltage regulation circuit 206 and that from the voltage regulation circuit 216.

The on-board control device 225 is configured to control the wireless power transmission side control device 202 via the wireless communications between the wireless power reception side communication device 302 and the wireless power transmission side communication device 203. In addition, the on-board control device 225 is also configured to control the voltage regulation circuits 206 and 216. The voltage regulation circuits 206 and 216, to which the pulse-width modulation gate signal is input, for example, from the on-board control device 225, are configured to output electrical power of high voltage in accordance with the pulse width of the signal.

Figure 18:
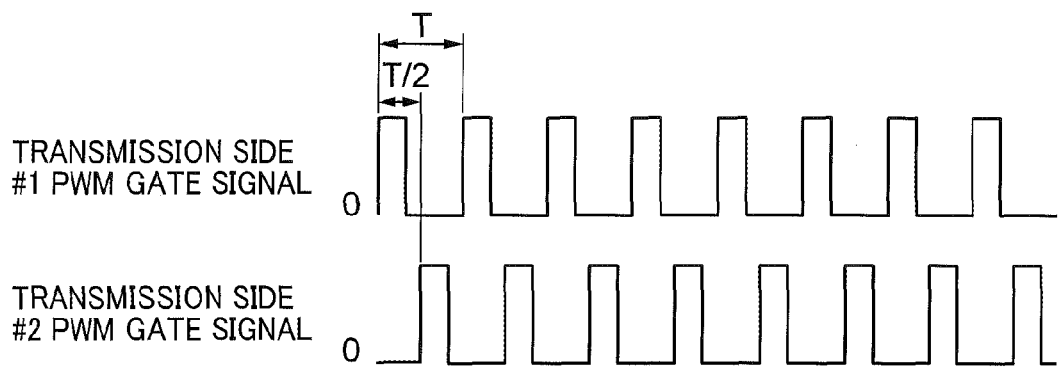
FIG. 18 is a diagram illustrating an example of a pulse-width modulation gate signal.

FIG. 18 illustrates exemplary pulse-width modulation gate signals (PWM gate signals) that are generated by the wireless power transmission side control device 202 for the inverters 204 and 214. The power transmission side #1 PWM gate signal is the pulse-width modulation gate signal generated for the inverter 204 and the power transmission side #2 PWM gate signal is the pulse-width modulation gate signal generated for the inverter 214. When the period of the pulse-width modulation gate signal is T, then the phases of the gate signals are deviated from each other by a T/2 period, i.e., 180 degrees. The amplitude of each gate signal is the same as that of the other gate signal. By virtue of this, the current phases of the power transmission couplers 201 and 211 are deviated by approximately 180 degrees, from each other and the power reception couplers 301 and 311 will respectively have substantially the same distance with respect to each of the power transmission couplers by the position adjustment illustrated in FIG. 3(A), so that the phases of the received currents are deviated by approximately 180 degrees. Accordingly, the magnetic fields occurring at each of the coupler pairs are offset by each other and the magnetic field leakage can be effectively reduced.

Figure 19:
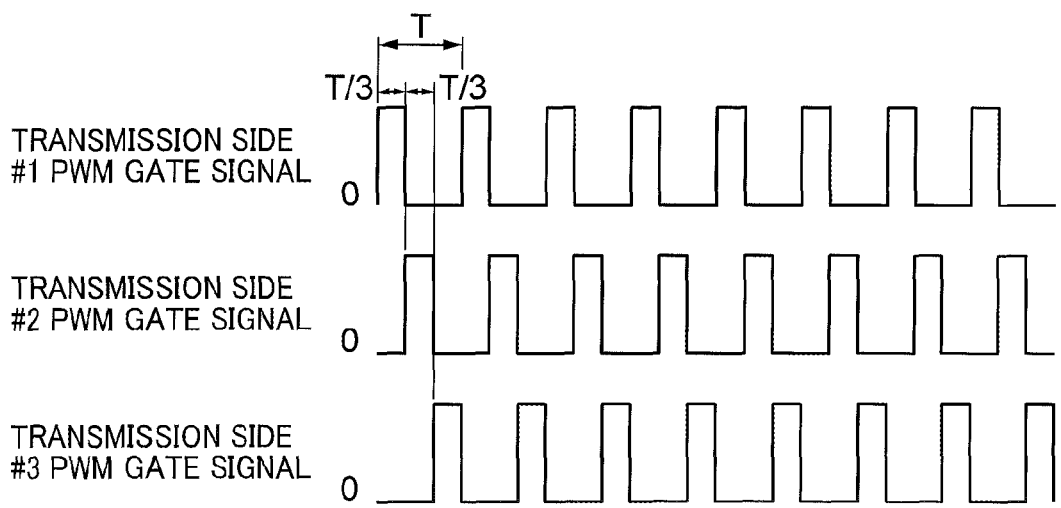
FIG. 19 is a diagram illustrating another example of the pulse-width modulation gate signal.

While FIG. 18 illustrates the example of the gate signals in the case where two channels of the wireless power transfer units are provided, FIG. 19 illustrates an example of the gate signals in case where three channels of the wireless power transfer units are provided. The phases of the individual gate signals are deviated from each other by a T/3 period, i.e., by 120 degrees. The amplitudes of the individual gate signals are identical with each other. By virtue of this, as has been described by way of FIG. 14, the current phases of three power transmission couplers are deviated from each other approximately by 120 degrees, and the three power reception couplers have substantially the same distance with respect to the corresponding power transmission couplers by the positional adjustment illustrated in FIG. 3(A), so that the phases of the power reception currents are deviated from each other approximately by 120 degrees. Accordingly, the magnetic fields occurring in each of the coupler pairs are offset by each other and magnetic field leakage can be effectively reduced.

Figure 20:
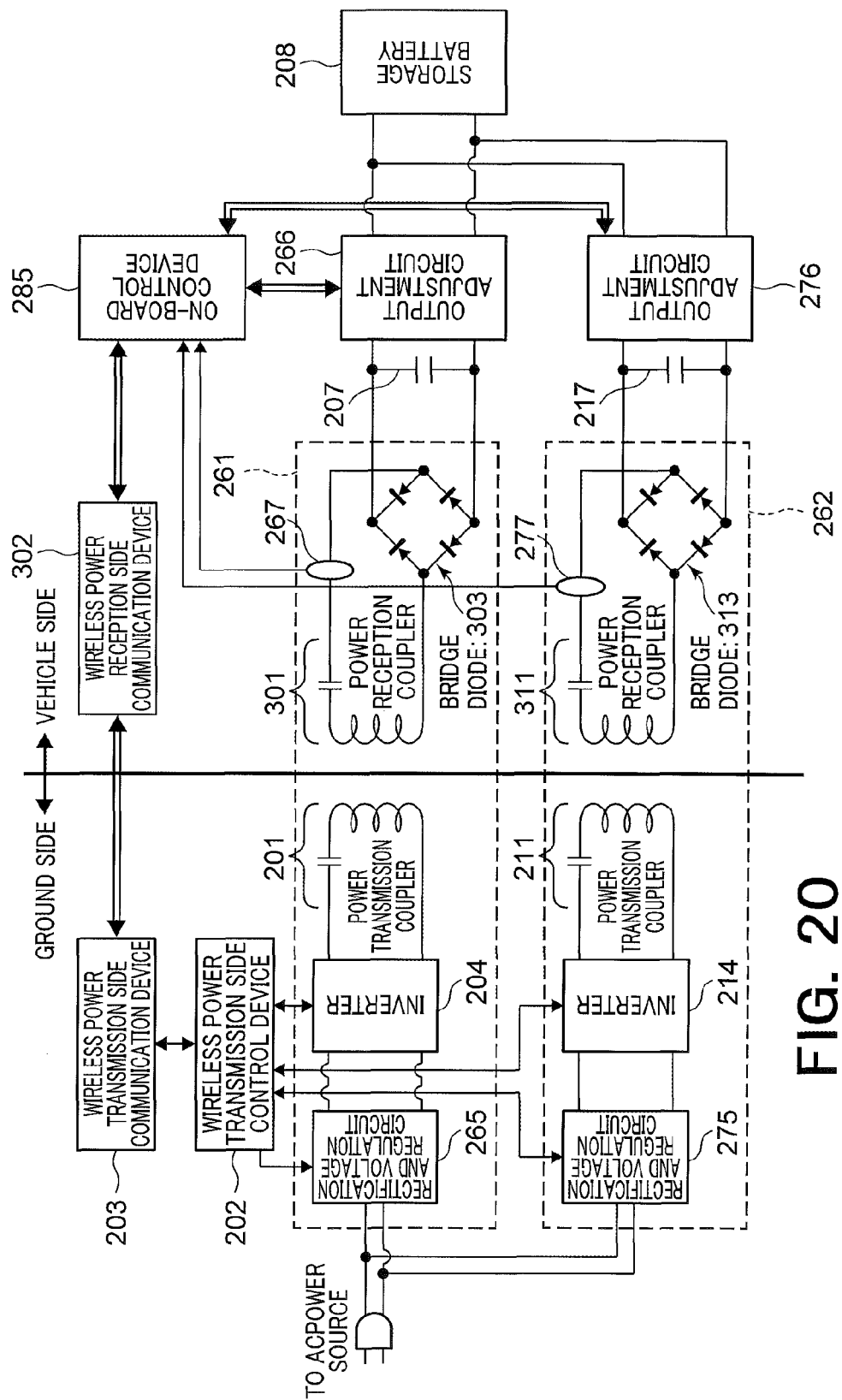
FIG. 20 is a functional block diagram of another example of the wireless power transmission system according to the embodiment of the present invention.

FIG. 20 illustrates a functional block diagram of another example of the wireless power transmission system according to the embodiment of the present invention. The rectification circuits 205 and 215 of the FIG. 17 are replaced by the rectification and voltage regulation circuits 265 and 275, and the voltage regulation circuits 206 and 216 are replaced by the output adjustment circuits 266 and 276, respectively. Current sensors 267 and 277 that are each adapted to detect the amount of the currents flowing in the power reception couplers 301 and 311, respectively, are additionally provided. Also, the reference numeral of the on-board control device is given as 285 and the reference numerals of the wireless power transfer units are given as 261 and 262. The same numerals are assigned to the blocks having the same functions as those in FIG. 17 and redundant explanation thereof is omitted.

The rectification and voltage regulation circuits 265 and 275 are configured to generate, under the control of the wireless power transmission side control device 202, DC power having the current amplitude or voltage amplitude instructed by the wireless power transmission side control device 202 from the AC power of the commercial power source, and supply the generated DC power to the inverter 204.

The inverters 204 and 214 are configured to convert the DC power supplied from the rectification and voltage regulation circuits 265 and 275 in accordance with the control by the wireless power transmission side control device 202 and generate high-frequency AC power. In this respect, the inverters 204 and 214 are configured to control the phase of the generated high-frequency AC power in accordance with the instruction by the wireless power transmission side control device 202.

The current sensors 267 and 277 are configured to detect the amount of current (amplitude) and the phase of the current flowing in the power reception couplers 301 and 302, respectively, and notify the detected amount of current to the on-board control device 285. The output adjustment circuits 266 and 276 are configured to generate, in the same or similar manner as the voltage regulation circuits 206 and 216 of FIG. 17, the appropriate DC voltage in accordance with the storage battery 208, and supply electrical power having this voltage to the storage battery 208. In addition, the output adjustment circuits 266 and 276 may also be configured to detect information such as voltage and output the detected information to the on-board control device 285. The output adjustment circuits 266 and 276 may also be configured to detect the amount (amplitude) and the phase of the currents flowing in the power reception couplers 301 and 302, respectively. The on-board control device 285 is configured to notify the information that is notified from the current sensors 267 and 277 and the voltage regulation circuits 206 and 216 to the wireless power transmission side control device 202.

The operation of the system of FIG. 20 is described below. With regard to a product (I×N) of the currents flowing in the power transmission couplers 201 and 211 and the power reception couplers 301 and 311 and the numbers of windings of the coils of the respective couplers, explanation is divided into three cases, i.e., a case where the products (I×N) of the power transmission couplers 201 and 211 are sufficiently larger than those of the power reception couplers 301 and 311, another case where the products (I×N) of the power reception couplers 301 and 311 are sufficiently larger than those of the power transmission couplers 201 and 211, and still another case where the products (I×N) of the power reception couplers 301 and 311 and those of the power transmission couplers 201 and 211 take values that are close to each other.

When the products (I×N) of the power transmission couplers 201 and 211 are sufficiently larger than those of the power reception couplers 301 and 311, then the phases and the amplitudes of the power transmission currents are controlled taking into account the current phases and the current amplitudes of the power transmission couplers 201 and 211 only, such that the vector sum at a distant point of the induction magnetic field is reduced. As one example, the wireless power transmission side control device 202 makes the current phases of the power transmission couplers 201 and 211 different from each other by 180 degrees, and controls the current and voltage regulation circuits 265 and 275 and the inverters 204 and 214 such that the current amplitudes of the power transmission couplers 201 and 211 become identical with each other. It should be noted here that the cases where the products (I×N) of the power transmission couplers 201 and 211 are sufficiently larger than those of the power reception couplers 301 and 311 may include, though not limited to this example, a case where, as one example, the differences or ratios between the products (I×N) of the power transmission couplers 201 and 211 and the products (I×N) of the power reception couplers 301 and 311 are respectively larger than a threshold.

In addition, when the products (I×N) of the power reception couplers 301 and 311 are sufficiently larger than those of the power transmission couplers 201 and 211, then the amplitudes and the phases of the power transmission currents are controlled taking into account the current phases and the current amplitudes of the power reception couplers 301 and 311, such that the vector sum at a distant point of the induction magnetic field is reduced. As one example, information such as the amplitude and the phase of the current detected by the output adjustment circuit 266 and 276 and the current sensors 267 and 277 is fed back via the on-board control device 280 to the wireless power transmission side control device 202. The wireless power transmission side control device 202 makes the current phases of the power reception couplers 301 and 311 different from each other by 180 degrees, controls the current and voltage regulation circuits 265 and 275 and the inverters 204 and 214 such that the current amplitudes of the power reception couplers 301 and 311 become identical with each other, and adjusts the amplitudes and the phases of the power transmission currents input to the power transmission couplers 201 and 211. It should be noted here that the cases where the products (I×N) of the power reception couplers 301 and 311 are sufficiently larger than those of the power transmission couplers 201 and 211 may include, though not limited to this example, a case where, as one example, the differences or ratios between the products (I×N) of the power reception couplers 301 and 311 and the products (I×N) of the power transmission couplers 201 and 211 are respectively larger than a threshold.

Meanwhile, when the products (I×N) of the power reception couplers 301 and 311 and those of the power transmission couplers 201 and 211 take values that are close to each other, information such as the amplitudes and the phases of the currents detected by the output adjustment circuits 266 and 276 of the power reception side is notified via the on-board control device 285 to the wireless power transmission side control device 202. The wireless power transmission side control device 202 controls the multi-channel inverters 204 and 214 and the rectification and voltage regulation circuits 265 and 275 on the basis of the values of the amplitudes and the phases of the power reception side currents and the values of the amplitudes and the phases of the power transmission side currents.

Figure 21:
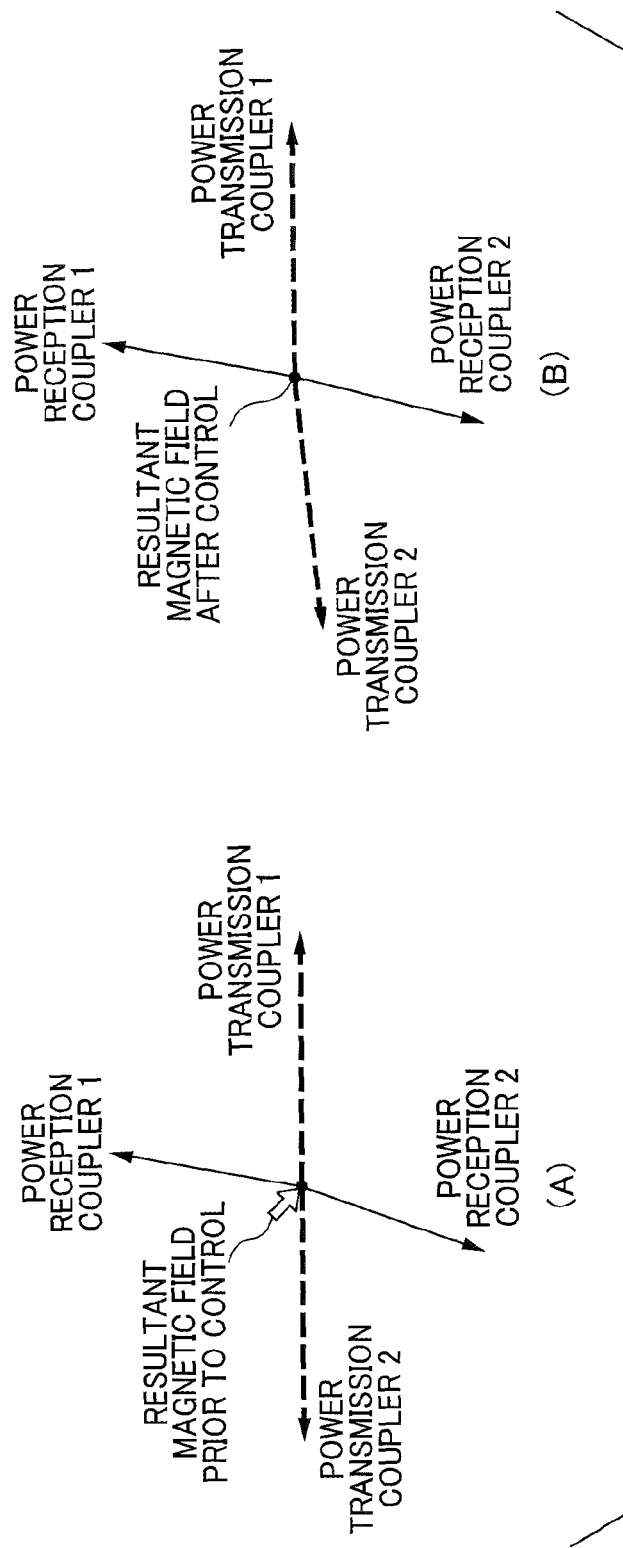
FIG. 21 is an explanatory diagram of the operation of the system illustrated in FIG. 20.

For example, with regard to the two power reception couplers 1 and 2 and the two power transmission couplers 1 and 2, it is assumed here that the values of the amplitudes and the phases of the currents of the power reception couplers 1 and 2 and the values of the amplitudes and the phases of the currents of the power transmission couplers 1 and 2 have the relationship illustrated in FIG. 21(A). The power reception couplers 1 and 2 correspond, for example, to the power reception couplers 301 and 311 of FIG. 20, respectively, and the power transmission couplers 1 and 2 correspond to the power transmission couplers 201 and 211, respectively. In this case, for example, as illustrated in FIG. 21(B), the amplitude and the phase of the power transmission coupler 2 with respect to the power transmission coupler 1 is adjusted such that the resultant magnetic field due to the currents flowing in the individual couplers of the transmission side and the reception side becomes small. In the case of FIG. 21(B), according to the information of the amplitude and the phase of the current detected by the current sensors 267 and 277, the current of the power reception coupler 1 with respect to the power transmission coupler 1 has its amplitude deviated to 80 percent and its phase by 80 degrees, and the current of the power reception coupler 2 with respect to the power transmission coupler 2 has its amplitude deviated to 72 percent and the phase by 70 degrees. Prior to the adjustment, the amplitude of the power transmission coupler 2 is identical with that of the power transmission coupler 1, and the phase of the power transmission coupler 2 is deviated by 180 degrees. This situation is adjusted such that the amplitude of the power transmission coupler 2 with respect to the power transmission coupler 1 is deviated to 96 percent and its phase is deviated by 186 degrees, so that the resultant magnetic field due to the currents flowing in the individual couplers of the transmission side and the reception side can be reduced to about one tenth.

In this manner, the vector sum at a distant point of the induction magnetic field due to the currents of each power transmission coupler and each power reception coupler is reduced, thereby reducing the leakage magnetic field.

It should be noted that the cases where the products (I×N) of the power reception couplers 301 and 311 and those of the power transmission couplers 201 and 211 are close to each other may also include a case where the differences or ratios between the products (I×N) of the power reception couplers 301 and 311 and the products (I×N) of the power transmission couplers 201 and 211 respectively fall within a predetermined range.

It should also be noted that, although a case where two channels of the wireless power transmission and reception units are provided is illustrated in FIG. 20, the control of the amplitudes and the phases of the currents can be implemented in the same or similar manner when there are provided three channels thereof.

In this embodiment, the amplitudes and the phases of the power transmission currents of the respective power transmission couplers are controlled. Meanwhile, another configuration is also possible according to which the amplitudes and the phases of the power transmission voltages of respective power transmission couplers are controlled.

It should be noted that the above-described embodiments can be applied to various electrical appliances that are operated by secondary batteries as well as the mobile machine such as an electric automobile or a train and thus the same or similar effects can be expected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A mobile machine comprising:
   a mobile body capable of being tilted in a particular direction such that a distance between a particular part opposed to a travel surface and the travel surface is reduced; and
   a plurality of power transmission resonators arranged at portions of the particular part of the mobile body, heights of the portions with reference to the travel surface being approximately identical with each other in a state of the mobile body being tilted,
   wherein the plurality of power transmission resonators receive electric power from a plurality of other power transmission resonators arranged on the travel surface opposed to the plurality of power transmission resonators in a state in which the mobile body is tilted in the particular direction, by coupling with induced magnetic fields from the other power transmission resonators, and phases of the induced magnetic fields radiated from the other power transmission resonators relate such that the induced magnetic fields cancel each other.

2. The mobile machine according to claim 1, wherein the power transmission resonators are arranged in a single line in a direction approximately orthogonal to the particular direction.

3. The mobile machine according to claim 1, wherein the particular direction is a leftward direction of the mobile machine and the particular part is a left portion of the mobile body.

4. The mobile machine according to claim 1, wherein the particular direction is a rightward direction of the mobile machine and the particular part is a right portion of the mobile body.

5. The mobile machine according to claim 1, wherein the particular direction is a frontward direction of the mobile machine, and the particular part is a front portion of the mobile body.

6. The mobile machine according to claim 1, wherein the particular direction is a rearward direction of the mobile machine and the particular part is a rear portion of the mobile body.

7. The mobile machine according to claim 1, wherein the particular part is a lower surface portion of the mobile body.

8. The mobile machine according to claim 2, wherein the power transmission resonators each include a magnetic core and a coil wound around the magnetic core, and the power transmission resonators are arranged such that a wind direction of the coil is substantially parallel to a right-left direction of the mobile machine.

9. The mobile machine according to claim 1, wherein the power transmission resonators are arranged at a predetermined interval.

10. The mobile machine according to claim 1, wherein the power transmission resonators are each configured to wirelessly receive electrical power from a plurality of other power transmission resonators arranged on the travel surface so as to be opposed to the power transmission resonators of the mobile machine in a state where the mobile body is tilted in the particular direction.

11. The mobile machine according to claim 10, wherein the mobile body is configured to charge a storage battery with electrical energy on the basis of the electrical power received by the power transmission resonators, and to travel using as a driving source the electrical energy stored in the storage battery.

12. The mobile machine according to claim 1, wherein the mobile machine is a vehicle.

13. The mobile machine according to claim 12, wherein the vehicle is an autobus having a kneeling function and the autobus makes a body of the autobus tilted in the particular direction by the kneeling function.

14. A wireless power transmission system comprising:
a mobile machine comprising a mobile body capable of being tilted in a particular direction such that a distance between a particular part opposed to a travel surface and the travel surface is reduced;
a plurality of first power transmission resonators arranged at portions of the particular part of the mobile body, heights of the portions with reference to the travel surface being approximately identical with each other in a state of the mobile body being tilted; and
a plurality of second power transmission resonators arranged on the travel surface so as to be opposed to the first power transmission resonators of the mobile machine, the second power transmission resonators being configured to wirelessly transmit electrical power to the first power transmission resonators by generating induced magnetic fields that couple with the first power transmission resonators, wherein the plurality of first power transmission resonators receive electric power from the second power transmission resonators in a state in which the mobile body is tilted in the particular direction, by coupling with the induced magnetic fields from the second power transmission resonators, and phases of the induced magnetic fields radiated from the second power transmission resonators relate such that the induced magnetic fields cancel each other.

15. A wireless power transmission method comprising:

tilting a mobile machine comprising a mobile body capable of being tilted in a particular direction such that a distance between a particular part opposed to a travel surface and the travel surface is reduced;

providing a plurality of first power transmission resonators arranged at portions of the particular part of the mobile body, heights of the portions with reference to the travel surface being approximately identical with each other in a state of the mobile body being tilted wherein the mobile machine is tilted in the particular direction so that the first power transmission resonators are opposed to a plurality of second power transmission resonators arranged on the travel surface; and wirelessly transmitting electrical power from the second power transmission resonators to the first power transmission resonators by generating induced magnetic fields that couple with the first power transmission resonators in a state of the mobile body being titled in the particular direction, wherein the plurality of first power transmission resonators receive electric power from the second power transmission resonators in a state in which the mobile body is tilted in the particular direction, by coupling with induced magnetic fields from the second power transmission resonators, and phases of the induced magnetic fields radiated from the second power transmission resonators relate such that the induced magnetic fields cancel each other.

* * * * *